US010009687B2

(12) United States Patent
Lee et al.

(10) Patent No.: US 10,009,687 B2
(45) Date of Patent: Jun. 26, 2018

(54) AUDIO SYSTEM, METHOD OF OUTPUTTING AUDIO, AND SPEAKER APPARATUS

(71) Applicant: SAMSUNG ELECTRONICS CO., LTD., Suwon-si (KR)

(72) Inventors: Gyeong-tae Lee, Seoul (KR); Jong-bae Kim, Seoul (KR); Jong-in Jo, Suwon-si (KR); Whan-oh Sung, Seoul (KR); Joo-yeon Lee, Seoul (KR); Hwan Shim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 20 days.

(21) Appl. No.: 14/507,463

(22) Filed: Oct. 6, 2014

(65) Prior Publication Data

US 2015/0104037 A1 Apr. 16, 2015

(30) Foreign Application Priority Data

Oct. 10, 2013 (KR) ........................ 10-2013-0120605

(51) Int. Cl.
*H04B 3/00* (2006.01)
*H04R 3/12* (2006.01)
(Continued)

(52) U.S. Cl.
CPC ............... *H04R 3/12* (2013.01); *H04R 27/00* (2013.01); *H04S 7/308* (2013.01); *H04R 5/04* (2013.01);
(Continued)

(58) Field of Classification Search
CPC ...... H04R 5/04; H04R 2227/005; H04R 3/12; H04R 27/00; H04S 7/302; H04S 7/308; H04S 3/008
See application file for complete search history.

(56) References Cited

U.S. PATENT DOCUMENTS 7,929,720 B2 4/2011 Ishibashi et al.
7,978,866 B2 7/2011 Oteki
(Continued)

FOREIGN PATENT DOCUMENTS

CN 1622694 A 6/2005
CN 1701520 A 11/2005
(Continued)

OTHER PUBLICATIONS

International Search Report (PCT/ISA/210) dated Dec. 1, 2014, issued in International Application No. PCT/KR2014/008517.
(Continued)

*Primary Examiner* — Regina N Holder
(74) *Attorney, Agent, or Firm* — Sughrue Mion, PLLC

(57) ABSTRACT

An audio system, an audio outputting method, and a speaker apparatus are disclosed. The audio system includes a plurality of speaker modules connected to each other, a detection module configured to detect information of the plurality of speaker modules and user information, and a home control module configured to receive an audio signal, process the received audio signal based on the information of the plurality of speaker modules and the user information, and transmit the processed audio signal to the plurality of speaker modules.

6 Claims, 31 Drawing Sheets

(51) Int. Cl.
*H04R 27/00* (2006.01)
*H04R 5/04* (2006.01)
*H04S 7/00* (2006.01)

(52) U.S. Cl.
CPC ........ *H04R 2227/005* (2013.01); *H04S 7/302* (2013.01)

(56) References Cited

U.S. PATENT DOCUMENTS

| | | | | |
|---|---|---|---|---|
| 8,442,239 | B2 | 5/2013 | Bruelle-Drews | |
| 2004/0114770 | A1 | 6/2004 | Pompei | |
| 2004/0156512 | A1 | 8/2004 | Parker | |
| 2005/0271219 | A1 | 12/2005 | Bruelle-Drews | |
| 2006/0210101 | A1 | 9/2006 | Ishibashi et al. | |
| 2007/0147636 | A1 | 6/2007 | Oteki | |
| 2009/0214051 | A1 | 8/2009 | Lockett et al. | |
| 2013/0058503 | A1 | 3/2013 | Kato et al. | |
| 2013/0170647 | A1 | 7/2013 | Reilly et al. | |
| 2014/0003619 | A1 | 1/2014 | Sannie et al. | |
| 2014/0270324 | A1* | 9/2014 | Redmond ................ | H04R 1/02 381/395 |
| 2015/0287419 | A1* | 10/2015 | Chen ........................ | H04R 3/12 704/500 |

FOREIGN PATENT DOCUMENTS

| | | | |
|---|---|---|---|
| CN | 1835648 | A | 9/2006 |
| CN | 101009953 | A | 8/2007 |
| CN | 102469402 | A | 5/2012 |
| CN | 103002378 | A | 3/2013 |
| EP | 2 557 813 | A2 | 2/2013 |
| FR | 2970574 | A1 | 7/2012 |
| JP | 7-29993 | U | 6/1995 |
| JP | 2006-129147 | A | 5/2006 |
| JP | 2007-180662 | A | 7/2007 |
| JP | 2008-197558 | A | 8/2008 |
| JP | 2011-199795 | A | 10/2011 |
| JP | 2015-501577 | A | 1/2015 |
| WO | 2013/055661 | A1 | 4/2013 |
| WO | 2013/099363 | A1 | 7/2013 |

OTHER PUBLICATIONS

Written Opinion (PCT/ISA/237) dated Dec. 1, 2014, issued in International Application No. PCT/KR2014/008517.
Communication dated Mar. 11, 2015, issued by the European Patent Office in counterpart European Application No. 14188310.8.
Communication dated Mar. 22, 2017, issued by the European Patent Office in counterpart European Application No. 14188310.8.
Communication dated Jan. 11, 2018, issued by The State Intellectual Property Office of P.R. China in counterpart Chinese Application No. 201410532863.3.
Communication dated Nov. 17, 2017, issued by the European Patent Office in counterpart European Application No. 14188310.8.
Communication dated Jun. 6, 2017 by the Japanese Patent Office in counterpart Japanese Patent Application No. 2016-521321.
Communication dated Jul. 14, 2017 by the State Intellectual Property Office of P.R. China in counterpart Chinese Patent Application No. 201410532863.3.
Communication dated Feb. 13, 2018, issued by the Japanese Patent Office in counterpart Japanese Application No. 2016-521321.

* cited by examiner

AUDIO SYSTEM, METHOD OF OUTPUTTING AUDIO, AND SPEAKER APPARATUS

CROSS-REFERENCE TO RELATED APPLICATION(S)

This application claims priority from Korean Patent Application No. 10-2013-0120605, filed on Oct. 10, 2013, in the Korean Intellectual Property Office, the disclosure of which is incorporated herein by reference in its entirety.

BACKGROUND

1. Field

Apparatuses, systems and methods consistent with exemplary embodiments relate to an audio system, an audio outputting method, and a speaker apparatus, and more particularly, to an audio system, an audio outputting method, and a speaker apparatus, which include a plurality of block type connectable speaker apparatuses and output audio according to a location of a block type speaker apparatus and a user location.

2. Description of the Related Art

Recently, there has been a rise in demand for an audio system providing excellent stereophonic sound that is separate from the audio system of, for instance, a digital television (TV). In addition, as mobile devices such as smart phones, tablet personal computers (PCs), etc. are increasingly used, demand for a mobile audio system compatible with the mobile devices has simultaneously increased.

In the related art, various speaker modules for respective reproduction frequency bands are present in an audio system. An example of the speaker module includes a woofer speaker module responsible for reproducing low-band audio, a mid-range speaker module responsible for reproducing middle-band audio, a tweeter speaker module responsible for reproducing high-band audio, and the like. In addition, various multi-way speakers may be configured by combining the aforementioned various speaker modules according to audio reproduction bands. For example a 2-way speaker may be configured by combining the mid-range speaker module and the tweeter speaker module, and a 3-way speaker module may be configured by combining the woofer speaker module, the mid-range speaker module, and the tweeter speaker module.

A speaker channel of an audio system may have various channel schemes depending on whether the audio system is used for listening to music, movie appreciation, and so on. For example, the speaker channel may have a 2-channel speaker having an active amplifier for a mobile device, a 2-channel speaker for a digital component, a 2.1-channel speaker for listening to music, a 5.1 channel home theater speaker for movie appreciation, and so on.

In the audio systems of the related art, conversion between various types of speaker systems is limited. For example, conversion between a one-way speaker and various multi-way speakers and conversion between a 2-channel speaker and various multichannel speakers is limited. For example, when an audio system includes a one-way multi-channel speaker, a user needs to buy a separate 2-way 2 channel speaker having installed therein a tweeter speaker module in order to improve sound quality of high band. In addition, when an audio system includes a 2-channel speaker or a 2.1-channel speaker, the user needs to buy a separate 5.1-channel audio system in order to experience stereoscopic sound. In addition, with regard to a 5.1-channel home theater audio system, when the 5.1-channel home theater audio system does not use a rear speaker, use of the rear speaker for another use or by another user is limited. In addition, when an audio system with a 7.1 channel or more various channel system is used, the problem may become more serious. Thus, there is a need for a flexible audio system that embodies various multi-way speakers and multi-channel speakers according to user service environments and needs.

Further, in the related art, when an audio system randomly sets positions and directions of speakers due to a structure of installment space, it is disadvantageous to form a sweet spot via localization.

Still further, in the related art, when a user wants to listen to a music source via a speaker while moving from one location to another, it is cumbersome to connect the output of the music source to an external input channel of an audio system installed at a current location.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments provide an audio system, an audio outputting method, and a speaker apparatus, which output audio according to a user location and a speaker location using a reconfigurable block type speaker module.

According to an aspect of an exemplary embodiment, there is provided an audio system including a plurality of speaker modules configured to be connected to each other, a detection module configured to detect information of a plurality of speaker modules and user information, and a home control module configured to receive an audio signal, process the received audio signal based on the information of the plurality of speaker modules and the user information, and transmit the processed audio signal to the plurality of speaker modules.

The plurality of speaker modules may include at least two of a full-range speaker, a tweeter speaker, a mid-range speaker, a woofer speaker, and a multi-way speaker.

In response to a first one-way speaker and a second one-way speaker being connected to each other among the plurality of speaker modules, the first one-way speaker and the second one-way speaker may be operated as a multi-way speaker.

The information of the plurality of speaker modules may include at least one of a connection correlation, locations, and radiation directions of the plurality of speaker modules, and the user information may include at least one of a current location, a moving direction, and preferred sound source information of a user.

In response to it being determined that the current location of the user is within a first area, the home control module may be further configured to process the received audio signal and transmit the processed audio signal to a first speaker module located in the first area among the plurality of speaker modules, and in response to it being determined that the user has moved from the first area to a second area, the home control module may be further configured to stop transmitting the processed audio signal to the first speaker module, process the received audio signal, and transmit the processed audio signal to a second speaker module located in the second area among the plurality of speaker modules.

The home control module may be further configured to localize the received audio signal based on the radiation directions of a speaker module among the plurality of speaker modules and at least one of the current location of the user and the moving direction of the user.

The home control module may be further configured to improve sound quality of audio to be reproduced by each of the plurality of speaker module by using the connection correlation of a speaker module among the plurality of speaker modules.

The audio system may further include a speaker jacket installed in each of the plurality of speaker modules in order to prevent diffraction and interference generated due to coupling between speaker modules of the plurality of speaker modules.

According to an aspect of another exemplary embodiment, there is provided a method of outputting audio of a home control module for controlling a plurality of speaker modules including detecting information of the plurality of speaker modules and user information, processing a received audio signal based on the information of the plurality of speaker modules and the user information, and transmitting the processed audio signal to the plurality of speaker modules.

The plurality of speaker modules may include at least two of a full-range speaker, a tweeter speaker, a mid-range speaker, a woofer speaker, and a multi-way speaker.

In response to a first one-way speaker and a second one-way speaker being connected to each other among the plurality of speaker modules, the detecting may further include detecting the first one-way speaker and second one-way speaker as a multi-way speaker.

The information of the plurality of speaker modules may include at least one of a connection correlation, locations, and radiation directions of the plurality of speaker modules, and the user information may include at least one of a current location, a moving direction, and preferred sound source information of a user.

The transmitting may include: processing the received audio signal and transmitting the processed audio signal to a first speaker module located in a first area among the plurality of speaker modules, in response to it being determined that the current location of the user is within the first area; and stopping the transmitting of the processed audio signal to the first speaker module, processing the received audio signal, and transmitting the processed audio signal to a second speaker module located in a second area among the plurality of speaker modules, in response to it being determined that the user has moved from the first area to the second area.

The processing may include localizing the received audio signal based on the radiation directions of a speaker module of the plurality of speaker modules and at least one of the current location of the user and the moving direction of the user.

The processing may include correcting sound quality of audio to be reproduced by each of the plurality of speaker modules by using the connection correlation of a speaker module of the plurality of speaker modules.

According to an aspect of another exemplary embodiment, there is provided a first speaker apparatus including a communicator configured to receive an audio signal, a first speaker configured to output audio, a connector configured for connection with a second speaker apparatus, a signal processor configured to process the received audio signal, and a controller configured to, in response to the first speaker apparatus being connected to the second speaker apparatus, control the signal processor to process the received audio signal to correspond to the first speaker and a second speaker of the second speaker apparatus.

Each of the first speaker and the second speaker may include one of a full-range speaker, a tweeter speaker, a mid-range speaker, a woofer speaker, and a multi-way speaker.

The controller may be further configured to, in response to a home control module for controlling the first speaker apparatus being present and the audio signal being received from the home control module, control the signal processor to process the received audio signal to correspond to the first speaker and the second speaker.

The controller may be further configured to, in response to a home control module for controlling the first speaker apparatus not being present and the audio signal being received from a source, control the signal processor to process the received audio signal to correspond to the first speaker and the second speaker, control the signal processor to process the received audio signal to correspond to an external speaker apparatus based on information about the external speaker apparatus and user information, and control the communicator to transmit the processed audio signals.

The controller may be further configured to determine a type of the second speaker and filter the received audio signal according to the determined type.

According to an aspect of another exemplary embodiment, there is provided an audio system including a home control module configured to receive an audio signal, process the received audio signal based on detected information of a plurality of speaker modules and detected user information, and transmit the processed audio signal to select speaker modules of the plurality of speaker modules based on the detected information of the plurality of speaker modules and the detected user information.

The detected information of the plurality of speaker modules may include at least one of a connection correlation, location, and radiation direction of the plurality of speaker modules.

The detected user information may include a current location of a user.

The connection correlation may include connection information of at least two one-way speaker modules among the plurality of speaker which are connected to each other to form a multi-way speaker module.

Each of the plurality of speaker modules may include at least one of a full-range speaker, a tweeter speaker, a mid-range speaker, a woofer speaker, and a multi-way speaker.

The plurality of speakers may be configured in at least one of a 2 channel audio environment, a 2.1 channel audio environment, a 5.1 channel audio environment, and a 7.1 channel audio environment, and the home control module may be further configured to process the received audio signal based on the configured audio environment and transmit the processed audio signal to select speaker modules of the plurality of speaker modules based on the configured audio environment.

Additional and/or other aspects and advantages of exemplary embodiments will be set forth in part in the description which follows and, in part, will be obvious from the description, or may be learned by practice of the invention.

BRIEF DESCRIPTION OF THE DRAWINGS

The above and/or other aspects will become more apparent by describing certain exemplary embodiments with reference to the accompanying drawings, in which.

DETAILED DESCRIPTION OF EXEMPLARY EMBODIMENTS

Figure 1:
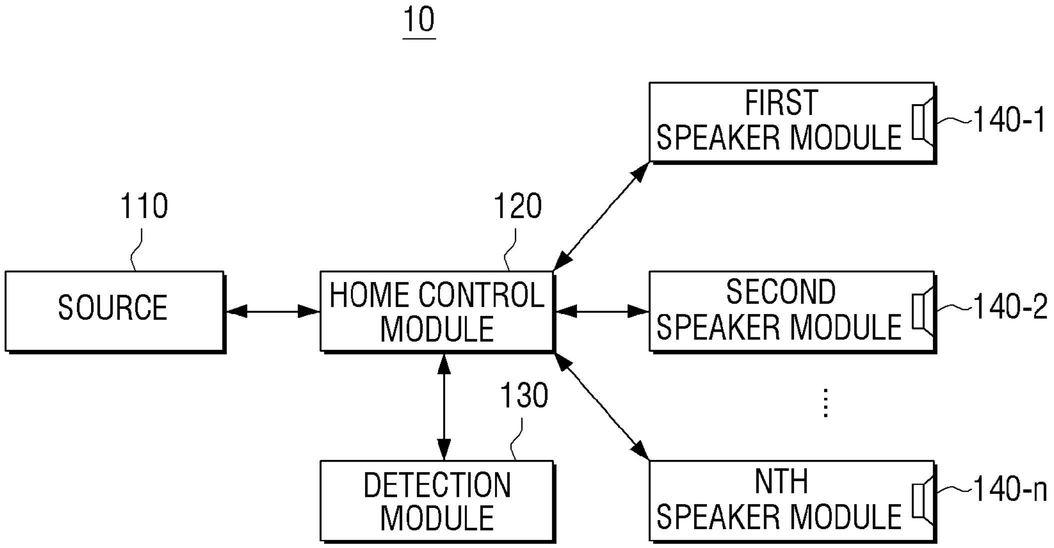
FIG. 1 is a block diagram of an audio system according to an exemplary embodiment.

Certain exemplary embodiments will now be described in greater detail with reference to the accompanying drawings.

In the following description, the same drawing reference numerals are used for the same elements, even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure the exemplary embodiments with unnecessary detail.

FIG. 1 is a block diagram of an audio system 10 according to an exemplary embodiment. As illustrated in FIG. 1, the audio system 10 includes a source 110, a home control module 120, a detection module 130, and a plurality of speaker modules 140-1 to **140-*n***.

The source 110 transmits an audio signal, to be output through the plurality of speaker modules 140-1 to **140-*n*, to the home control module 120. The source 110 may transmit the audio signal to the home control module 120 by wire or wirelessly. In addition, the source 110** may transmit a video signal to an external display device (not shown) by wire or wirelessly.

The source 110 may be embodied as various audio devices for transmitting an audio signal, such as a digital versatile disk (DVD) player, a sound bar, a smart phone, a tablet personal computer (PC), and so on.

The detection module 130 detects user information and information of the plurality of speaker modules 140-1 to **140-*n*. The user information may include at least one of a current location, moving direction, and preferred sound source information of a user. The information of the plurality of speaker modules 140-1 to 140-*n* may include at least one of a connection correlation, locations, and radiation directions of the plurality of speaker modules 140-1 to 140-*n***.

The detection module 130 may detect the user information and the information of the plurality of speaker modules 140-1 to **140-*n* using various methods. For example, the detection module 130 may detect the current location and moving direction of the user in a home by using a plurality of cameras installed in the home. In addition, the detection module 130 may detect the user by using various user authentication methods (e.g., face recognition, fingerprint recognition, iris scan, etc.) and acquire sound source information preferred by the user. In addition, the detection module 130 may detect the connection correlation and location of speaker modules using information transmitted from the plurality of speaker modules 140-1 to 140-*n*. In addition, the detection module 130 may detect the radiation directions of the plurality of speaker modules 140-1 to 140-*n* by using a camera. The aforementioned detection method is purely exemplary. Thus, the user information and the information of the plurality of speaker modules 140-1 to 140-*n*** may be detected using other different methods.

The plurality of speaker modules 140-1 to **140-*n* processes and outputs an audio signal transmitted through the home control module 120. The plurality of speaker modules 140-1 to 140-*n*** may include at least two of a full-range speaker, a tweeter speaker, a mid-range speaker, a woofer speaker, and a multi-way speaker. The full-range speaker is a speaker for reproducing all-band audio, the tweeter speaker is a speaker for reproducing high-band audio, the mid-range speaker is a speaker for reproducing middle-band audio, the woofer speaker is a speaker for reproducing low-band audio, and the multi-way speaker is a speaker obtained by combining speakers for reproducing various-band audio.

In particular, the plurality of speaker modules 140-1 to **140-*n* may be connected to each other to operate as a multi-way speaker module. For example, the full-range speaker and the tweeter speaker, as a one-way speaker, may be connected to each other to operate as a 2-way speaker. A method for reconfiguring the plurality of speaker modules 140-1 to 140-*n*** will be described below with reference to drawings.

The home control module 120 processes an audio signal received from the source 110 based on the user information and the information of the plurality of speaker modules 140-1 to **140-*n*, which are detected by the detection module 130**.

In detail, the home control module 120 may determine at least one speaker module among the plurality of speaker modules 140-1 to **140-*n*, to which the audio signal, received from the source 110, is to be transmitted, using the current location and the moving direction of the user, detected by the detection module 130. For example, when the user is currently positioned in a living room, the home control module 120 may determine at least one speaker module present in the living room where the user is currently positioned, as a speaker module to which the audio signal is to be transmitted. In addition, when the user moves to a bedroom from the living room, the home control module 120 may stop transmitting the audio signal to the speaker module present in the living room, and process and transmit an audio signal input to a speaker module present in the bedroom among a plurality of speaker modules. In addition, the home control module 120 may detect the detected preferred sound source information of the user and transmit the detected preferred audio signal of the user to some of the plurality of speaker modules 140-1 to 140-n**.

The home control module 120 may process an audio signal using at least one of the connection correlation, locations, and radiation directions of the plurality of speaker modules 140-1 to 140-n, which are detected by the detection module 130. For example, when a tweeter speaker module and a full-range speaker module among the plurality of speaker modules 140-1 to 140-n are connected to each other and are detected as a multi-way speaker, the home control module 120 may process the received audio signal as an audio signal corresponding to a combination of the detected multi-way speaker and transmit the audio signal to the detected multi-way speaker. In addition, the home control module 120 may repan the audio signal according to the radiation direction of a speaker and the user location, which are detected by the detection module 130, so as to provide an optimum sweet-spot to the user via localization or beam-forming.

The user may use an optimum audio system without separate manipulation via the aforementioned audio system.

According to the aforementioned exemplary embodiments, the detection module 130 may configured as a separate hardware block, which is purely exemplary. Thus, a function of the detection module 130 may be included in the home control module 120.

Hereinafter, an audio outputting method according to an exemplary embodiment will be described with reference to FIGS. 2 to 4D.

Figure 2:
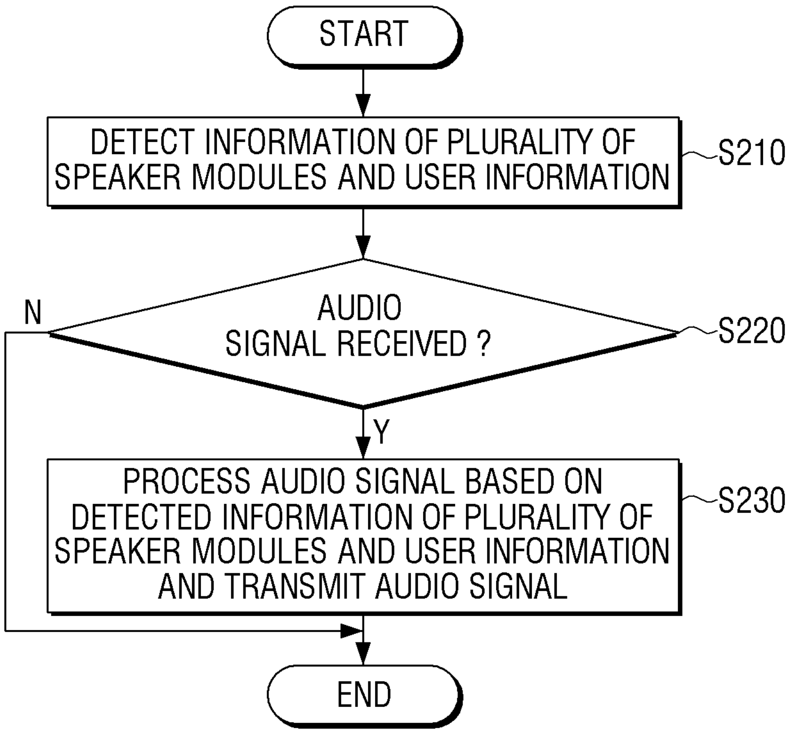
FIG. 2 is a flowchart of an audio outputting method of the audio system according to an exemplary embodiment.

FIG. 2 is a flowchart of an audio outputting method of the audio system 10 according to an exemplary embodiment.

First, the detection module 130 detects information of a plurality of speaker modules and user information (S210). The user information may include at least one of a current location, moving direction, and preferred sound source information of a user. The information of the plurality of speaker modules 140-1 to 140-n may include at least one of a connection correlation, locations, and radiation directions of the plurality of speaker modules 140-1 to 140-n. In addition, the detection module 130 may transmit the detected information of the plurality of speaker modules and the user information to the home control module 120.

The home control module 120 determines whether an audio signal is received from the source 110 (S220).

In response to determining that the audio signal is received (S220-Y), the home control module 120 processes the audio signal based on the detected user information and information of the plurality of speaker modules 140-1 to 140-n and transmits the audio signal to the plurality of speaker modules 140-1 to 140-n (S230).

Figure 3A:
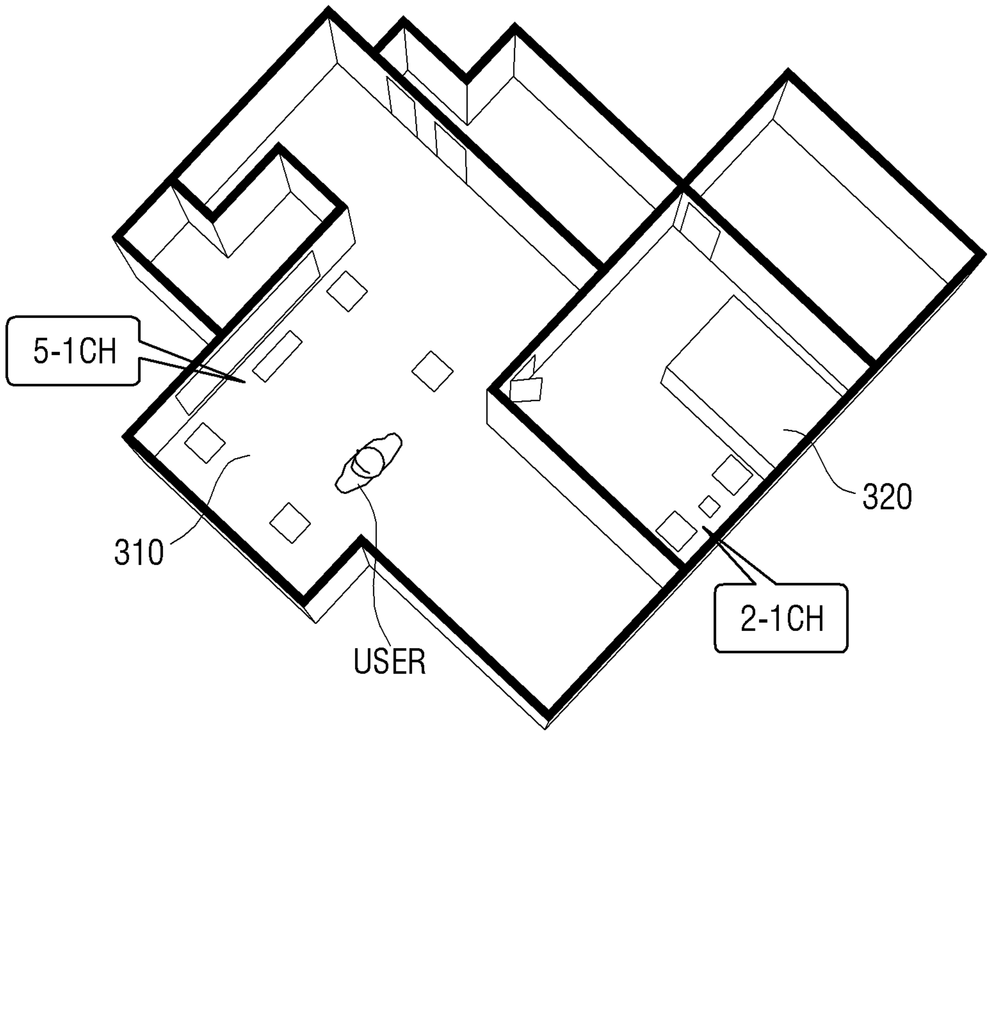
FIGS. 3A and 3B are diagrams for explanation of a method of outputting audio according to movement of a user according to an exemplary embodiment.
Figure 3B:
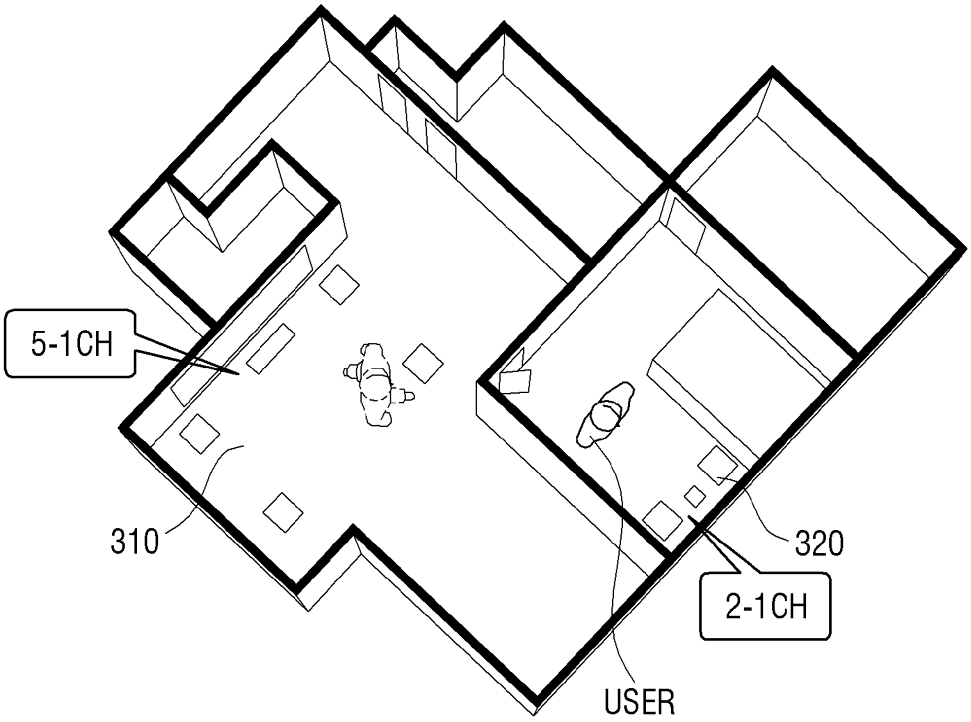

In detail, when it is determined that the user location detected by the detection module 130 is a first area, the home control module 120 processes and transmits an audio signal input to a speaker module contained in the first area among the plurality of speakers. In addition, when the detection module 130 determines that the user moves to a second area from the first area, the home control module 120 may stop transmitting the audio signal to the speaker module present in the first area, and process and transmit an audio signal input to a speaker module present in a second area among the plurality of speaker modules. For example, as illustrated in FIG. 3A, when the user is positioned in a living room 310 in which a 5.1-channel audio environment (5-1 CH) is realized, the home control module 120 may convert an audio signal received from the source 110 into 5.1-channel audio signals and transmit the converted audio signals to respective corresponding speaker modules. In addition, when the user is positioned is the living room 310 and then moves to a bedroom 320 in which a 2.1-channel audio environment (2.1 CH) is realized, as illustrated in FIG. 3B, the home control module 120 stops transmitting the audio signal to a plurality of speaker modules positioned in the living room 310. In addition, the home control module 120 may convert the audio signal received from the source 110 into 2.1-channel audio signals and transmit the audio signals to respective corresponding speaker modules. Through the aforementioned operation, by transmitting an audio signal to speaker modules present in an area where a user is positioned, according to movement of the user, the user may be provided with an optimum audio environment in an area where the user is positioned without separate manipulation.

Figure 4A:
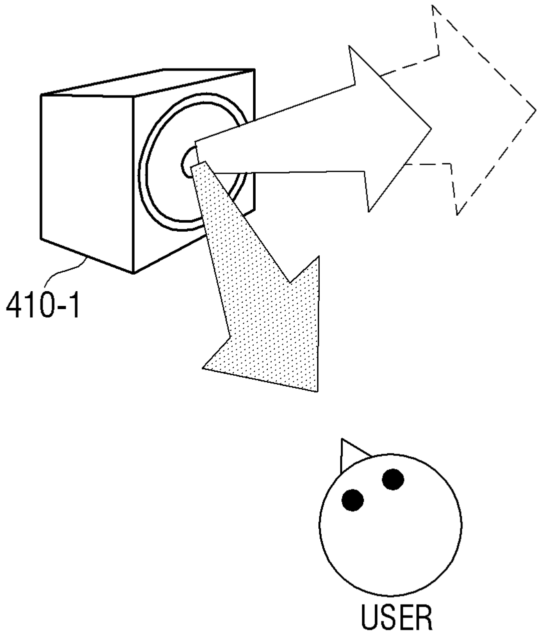
FIGS. 4A to 4D are diagrams for explanation of a method of outputting audio according to information of a speaker module according to an exemplary embodiment.
Figure 4B:
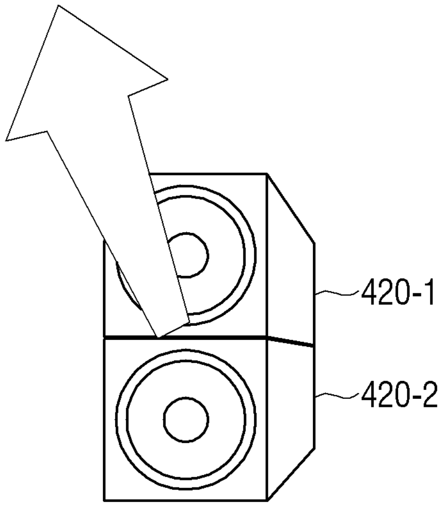
Figure 4C:
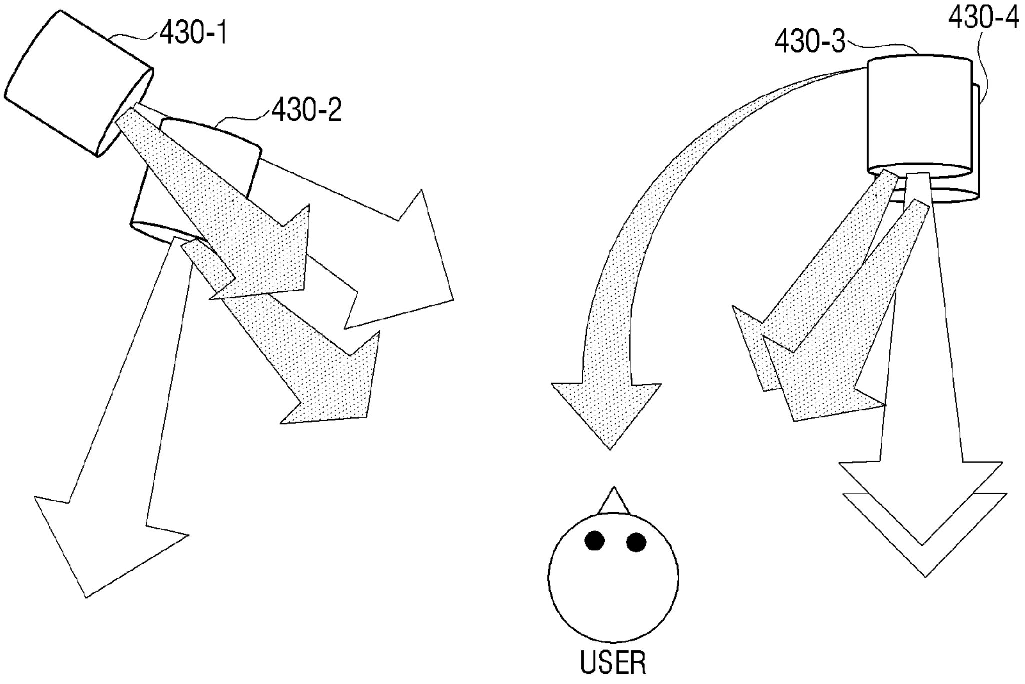

The home control module 120 may localize the audio signal based on the radiation direction of a speaker module and user location information, detected by the detection module 130. In detail, as illustrated in FIG. 4A, when a speaker 410-1 is not directed to the user, the home control module 120 may repan the speaker to provide optimum sweet-spot to a user. As illustrated in FIG. 4B, when a plurality of speaker modules 420-1 and 420-2 are connected to each other in a vertical direction, the home control module 120 may perform beam-forming using the plurality of speaker modules 420-1 and 420-2 that are connected to each other in a vertical direction. In addition, as illustrated in FIG. 4C, the home control module 120 may simultaneously perform repanning and beam-forming with respect to a plurality of speaker modules 430-1 to 430-4 so as to localize the audio signal according to the user location.

Figure 4D:
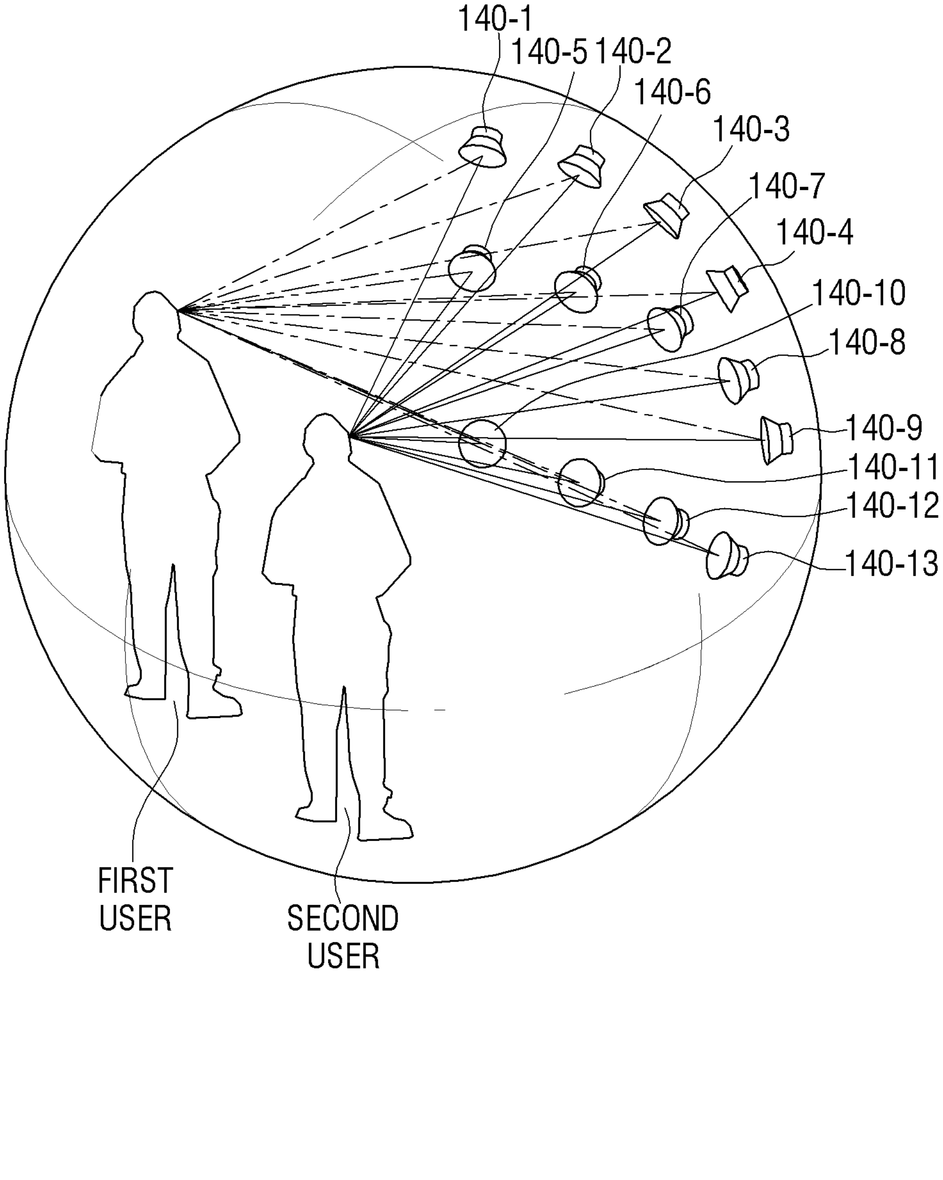

The home control module 120 may output different audio signals to respective users via beam-forming. In detail, as illustrated in FIG. 4D, the home control module 120 may control a first speaker module 140-1 to a thirteenth speaker module 140-13 to output respective different audio signals to each of a first user and a second user via beam-forming. The home control module 120 may detect positions and radiation directions of the speaker modules 140-1 to 140-13 as well as a plurality of user locations via the detection module 130. Thus, the home control module 120 may perform beam-forming based on a plurality of user locations, and the locations and radiation directions of the speaker modules 140-1 to 140-13, and output different audio signals to respective plural users. Through this, the user may receive various audio signals via the plurality of speaker modules 140-1 to 140-13. For example, the first user may listen to an audio signal generated based on English and the second user may listen to an audio signal generated based on Korean.

The home control module 120 may correct sound quality of audio to be reproduced by each speaker module using a connection correlation of speaker modules, detected by the detection module 130. For example, the home control module 120 may correct an audio signal 1 to be transmitted to a woofer speaker module, to a low-band audio signal, and transmit the low-band audio signal to a woofer speaker module. In addition, when the tweeter speaker module, the full-range speaker module, and the woofer speaker module are connected to operate as a multi-way speaker module, the home control module 120 may correct audio signals to be transmitted to the multi-way speaker module to an all-band audio signal and transmit the all-band audio signal to the multi-way speaker module. In addition, when the tweeter speaker module and the mid-range speaker module are connected to each other to operate as a multi-way speaker module, the home control module 120 may correct an audio signal to be transmitted to a multi-way speaker module, to high-band and middle-band audio signals, and transmit the high-band and middle-band audio signals to the multi-way speaker module.

Through the aforementioned operations, the user may experience an optimum audio environment in an area in which a speaker module controlled by a home control module is present.

Hereinafter, a reconfigurable speaker apparatus will be described with reference to FIGS. 5 to 11D.

Figure 5:
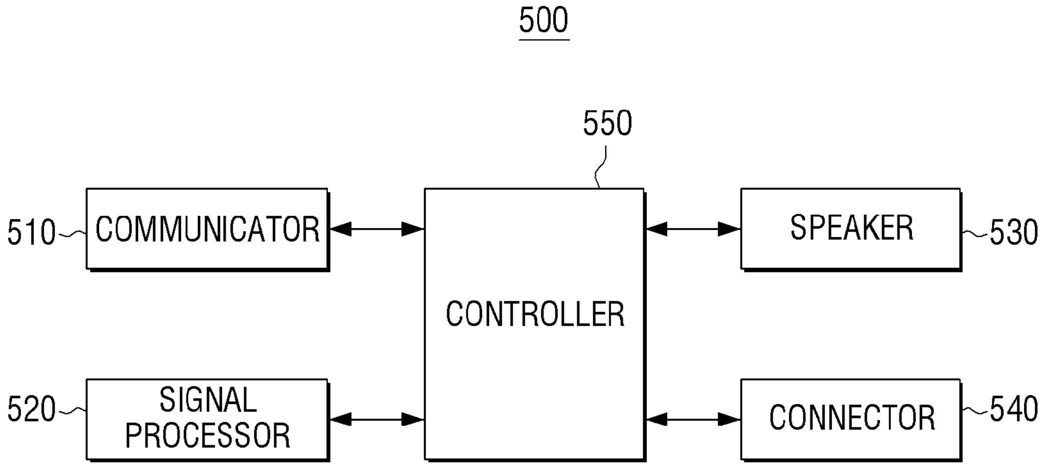
FIG. 5 is a block diagram illustrating a structure of a speaker apparatus according to an exemplary embodiment.

FIG. 5 is a block diagram illustrating a structure of a speaker apparatus 500 according to an exemplary embodiment. As illustrated in FIG. 5, the speaker apparatus 500 includes a communicator 510, a signal processor 520, a speaker 530, a connector 540, and a controller 550.

The communicator 510 communicates with an external device using various communication chips such as a WiFi chip, a Bluetooth chip, a near field communication (NFC) chip, a wireless communication chip, and so on. The WiFi chip, the Bluetooth chip, and the NFC chip perform communication using a WiFi scheme, a Bluetooth scheme, and an NFC scheme, respectively. Among these, the NFC chip refers to a chip that operates using a band of 13.56 MHz among various RF-ID frequency bands, such as 135 kHz, 13.56 MHz, 433 MHz, 860 to 960 MHz, 2.45 GHz, etc. When the WiFi chip or the Bluetooth chip is used, various connection information such as SSID, session key, etc. may be previously transmitted and received and communication may be performed using the connection information to transmit and receive various information. The wireless communication chip refers to a chip performing various communication standards, such as IEEE, Zigbee, $3^{rd}$ generation (3G), 3rd generation partnership project (3GPP), long term evolution (LTE), etc. According to the aforementioned exemplary embodiment, the communicator 510 communicates with an external device in a wireless communication manner, which is purely exemplary. Thus, the communicator 510 may communicate with the external device in a wired communication manner.

In particular, the communicator 510 may communicate with the home control module 120. The communicator 510 receives an audio signal of a channel corresponding to the speaker apparatus 500 from the home control module 120. For example, when the speaker apparatus 500 operates as a 5.1-channel center speaker, the communicator 510 may receive an audio signal corresponding to a center channel from the home control module 120.

When the speaker apparatus 500 is connected to another speaker apparatus via the connector 540, the communicator 510 may communicate with the other speaker apparatus. The communicator 510 may transmit an audio signal processed by the signal processor 520 to another speaker apparatus. For example, when the speaker apparatus 500 and another speaker apparatus are connected to each other, if an audio signal of one channel is received from outside, the communicator 510 may transmit an audio signal of a sound band corresponding to the other speaker apparatus, to the other speaker apparatus.

The communicator 510 may communicate with another speaker apparatus wirelessly. In particular, when the speaker apparatus 500 functions as a home control module, the communicator 510 may transmit an audio signal to the other speaker apparatus wirelessly.

The signal processor 520 may process the received audio signal to be output through a speaker.

In particular, the signal processor 520 may process an audio signal of one channel, received from the home control module 120, to correspond to a type of the speaker 530 of the speaker apparatus 500 using a cross over filter and a sound quality correction filter. For example, when the speaker 530 is a tweeter speaker for outputting high-band audio, the signal processor 520 may filter the received audio signal of one channel and output a high-band audio signal to the speaker 530.

The signal processor 520 may process an audio signal of one channel, received from the home control module 120, to correspond to a type of the other speaker apparatus using a cross over filter and a sound quality correction filter and transmit the processed audio signal through the communicator 510. For example, when the other speaker apparatus connected to the speaker apparatus 500 is a woofer speaker for outputting low-band audio, the signal processor 520 may filter an audio signal of one channel, received from the home control module 120, and transmit a low-band audio signal to the other connected speaker apparatus.

Accordingly, when the signal processor 520 may filter the audio signal of one channel, received from the home control module 120, according to a reproduction band of multi-way speaker apparatuses, and transmit the audio signal to each speaker apparatus, the multi-way speaker apparatus may operate as one speaker apparatus.

The speaker 530 outputs the audio signal processed by the signal processor 520. In particular, the speaker 530 may be embodied as one of various type speakers according to a reproduction frequency band. The speaker 530 may be embodied as a full-range speaker for reproducing all-band audio, a tweeter speaker for reproducing high-band audio, a mid-range speaker for reproducing middle-band audio, a woofer speaker for reproducing low-band audio, and a multi-way speaker for reproducing various-band audio. The speaker apparatus 500 may operate as a multi-way speaker apparatus via various combinations with other speaker apparatuses according to a type of the speaker 530, which will be described below with reference to FIGS. 7A to 7G.

Figure 6:
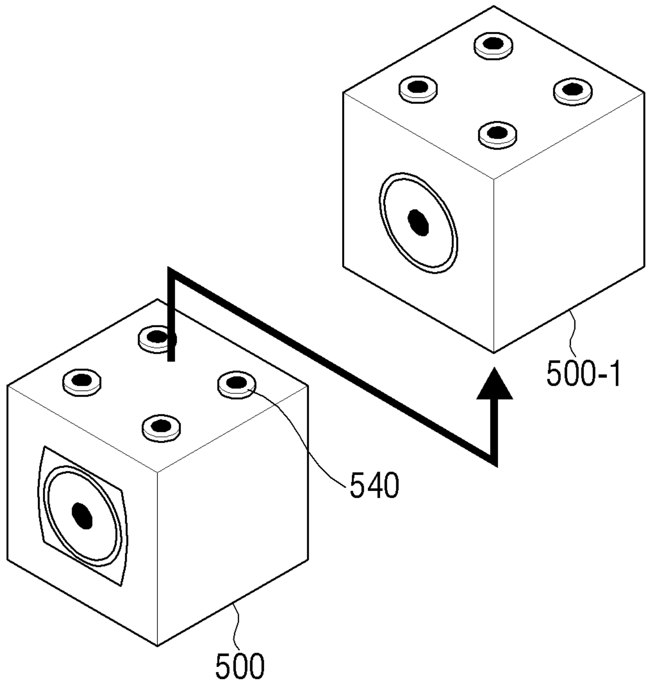
FIG. 6 is a diagram illustrating an outer appearance of a speaker apparatus according to an exemplary embodiment.

The connector 540 detects connection with another speaker apparatus. As illustrated in FIG. 6, the connector 540 may protrude from an upper surface of the speaker apparatus 500 and may be shaped like a circle. The speaker apparatus 500 may be connected to another speaker apparatus 500-1 by installing the connector 540, which protrudes from the upper surface of the speaker apparatus 500 and is shaped like a circle, in a connector that is concaved in a lower surface the other speaker apparatus 500-1 and is shaped like a circle.

The connector 540, which protrudes from the upper surface of the speaker apparatus 500 and is shaped like a circle as illustrated in FIG. 6, is purely exemplary. Thus, the connector 540 may be embodied in various forms using various methods. For example, the connector 540 may protrude from the upper surface of the speaker apparatus 500 and may be shaped like a square, and the connector 540 may be embodied as a magnet.

The controller 550 may control an overall operation of the speaker apparatus 500. In particular, when the speaker apparatus 500 is connected to another speaker apparatus (e.g., 500-1) via the connector 540, the controller 550 may control the signal processor 520 to process an audio signal received through the communicator to correspond to the speaker 530 and a speaker of the other speaker apparatus 500-1.

According to an exemplary embodiment, when the home control module 120 for controlling the speaker apparatus 500 is present, that is, when the speaker apparatus 500 is present in the home, the controller 550 may process the audio signal received from the home control module 120 through the communicator 510 to correspond to the speaker 530 and a speaker of the other speaker apparatus 500-1.

When the speaker 530 of the speaker apparatus 500 is a tweeter speaker, the speaker of the other speaker apparatus 500-1 connected to the speaker apparatus 500 is a full-range speaker, and a multi-way speaker formed by connecting the tweeter speaker and the full-range speaker operates a right-channel speaker in a 2-channel audio environment, the controller 550 may control the communicator 510 to receive an audio signal corresponding to a right channel from the home control module 120.

The controller 550 may filter the received audio signal of the right channel using a cross over filter and a sound quality filter to acquire a high-band audio signal and output the acquired high-band audio signal through the speaker 530 as a tweeter speaker.

In addition, the controller 550 determines a type of the speaker of the other speaker apparatus 500-1 connected to the connector 540 and filter the audio signal received through the communicator 510 according to the type. That is, the controller 550 may determine that the speaker of the other speaker apparatus 500-1 connected to the connector 540 is a full-range speaker, filter the audio signal of a right channel, received through the communicator 510, to acquire an all-band audio signal, and control the communicator 510 to output the acquired all-band audio signal to the other speaker apparatus 500-1 as a full-range speaker.

When the home control module 120 is not present, the controller 550 may process the audio signal received from a source through the communicator 510 to correspond to the speaker 530 and a speaker of the other speaker apparatus 500-1, process the audio signal to correspond to an external speaker apparatus based on information of the external speaker apparatus and user information, and transmit the audio signal. That is, when the home control module 120 is not present, the speaker apparatus 500 may perform a function of the home control module 120.

Accordingly, the speaker apparatus 500 having a one-way speaker may be connected to the other speaker apparatus 500-1 having a one-way speaker and may operate as a multi-way speaker.

Hereinafter, various combinations of speaker apparatuses will be described with reference to FIGS. 7A to 7G.

Figure 7A:
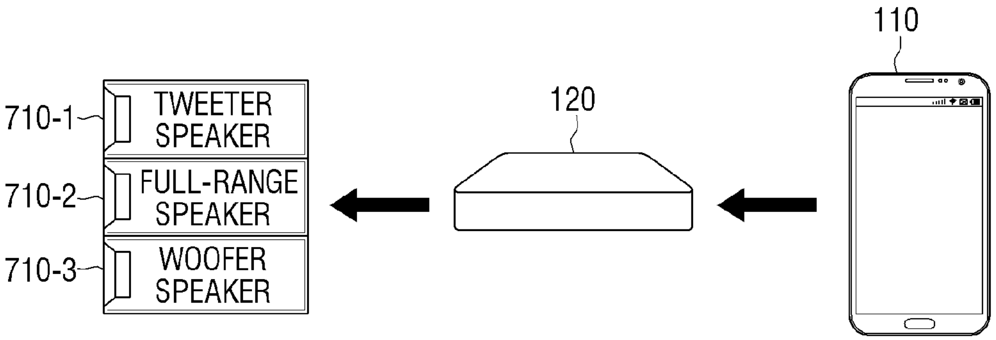
FIGS. 7A to 7G are diagrams illustrating coupling of various speaker apparatuses according to various exemplary embodiments.

FIG. 7A is a diagram for explanation of reconfiguring a plurality of one-way speakers as a multi-way speaker using a full-range speaker according to an exemplary embodiment.

A full-range speaker is a speaker for reproducing all-band audio. In particular, in order for a user to reinforce high-band audio or low-band audio, a multi-way speaker may be reconfigured by combining a full-range speaker 710-2 with a tweeter speaker 710-1 and a woofer speaker 710-3, as illustrated in FIG. 7A.

The full-range speaker 710-2 may receive an audio signal of one channel from the home control module 120, filter the received audio signal to output an all-band audio signal via the full-range speaker 710-2 itself, output a high-band audio signal via the tweeter speaker 710-1, and output a low-band audio signal via the woofer speaker 710-3.

Thus, the user may reconfigure a plurality of one-way speakers as a 3-way speaker using the full-range speaker 710-2.

Figure 7B:
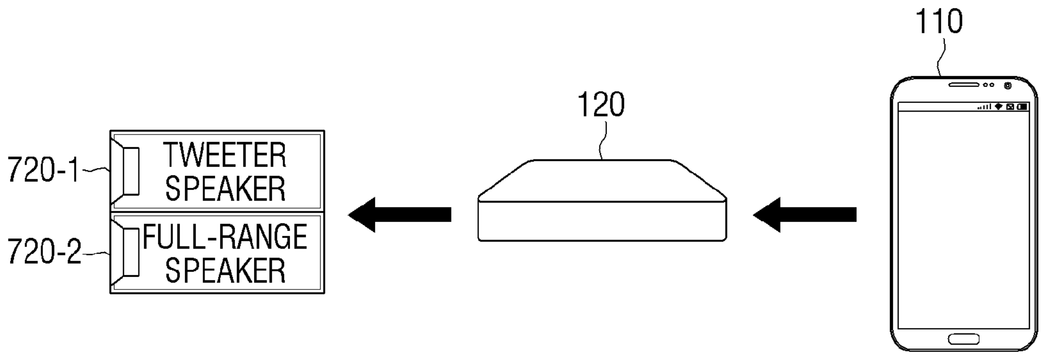

FIG. 7B is a diagram for explanation of reconfiguring a plurality of one-way speakers as a multi-way speaker using a tweeter speaker according to an exemplary embodiment.

A tweeter speaker is a speaker for reproducing high-band audio. In particular, a full-range speaker has a wider diaphragm than a tweeter speaker. Thus, as a reproduction band of the full-range speaker is further close to a high band, a main beam width of a directivity beam pattern is narrowed to increase directivity. As directivity is increased, reduction in sound pressure according to an off-axis angle of a speaker is increased, thereby deteriorating spatial acoustic radiation characteristics. Thus, the tweeter speaker may be used to compensate high-band reproduction limitation of the full-range speaker to improve a high-band sound field effect. Accordingly, as illustrated in FIG. 7B, a multi-way speaker may be reconfigured by combining a tweeter speaker 720-1 and a full-range speaker 720-2.

The tweeter speaker 720-1 may receive an audio signal of one channel from the home control module 120, filter the received audio signal to output a high-band audio signal via the tweeter speaker 720-1 itself, and output an all-band audio signal via the full-range speaker 720-2.

Thus, the user may reconfigure a plurality of one-way speakers as a 2-way speaker for improving a high-band sound field effect using the tweeter speaker 720-1.

Figure 7C:
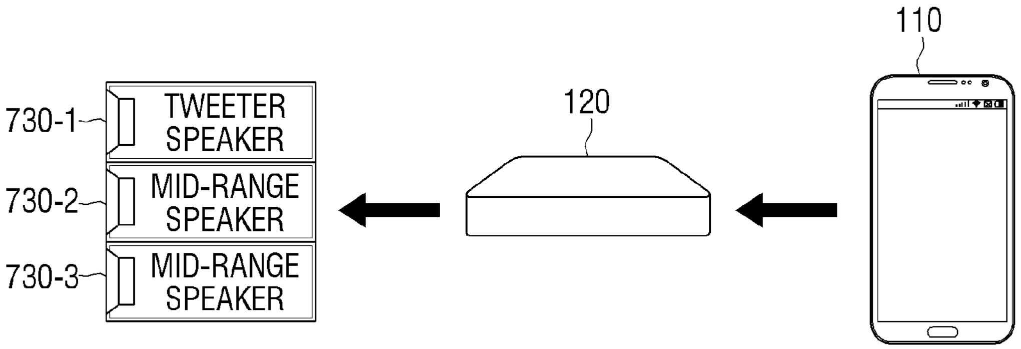
Figure 7D:
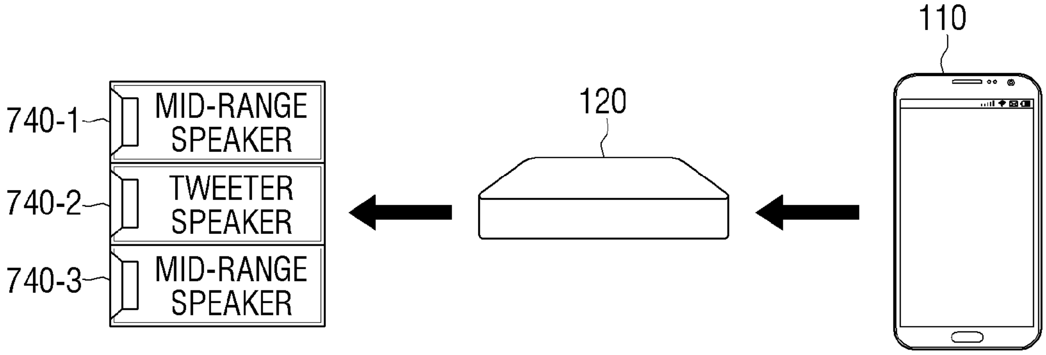

FIGS. 7C and 7D are diagrams for explanation of reconfiguring a plurality of one-way speakers as a multi-way speaker using a mid-range speaker according to an exemplary embodiment.

A mid-range speaker is a speaker for reproducing middle-band audio. As illustrated in FIG. 7C, a tweeter speaker 730-1 and two mid-range speakers 730-2 and 730-3 may be sequentially connected to operate as a TMM 3-way speaker. As illustrated in FIG. 7D, a tweeter speaker 740-2 may be connected between two mid-range speakers 740-1 and 740-3 to operate as a MTM 3-way speaker.

One of the two mid-range speakers may receive an audio signal of one channel from the home control module 120, filter the received audio signal to output a middle-band audio signal via itself and the other mid-range speaker, and output a high-band audio signal via a tweeter speaker.

Accordingly, the user may reconfigure a plurality of one-way speakers as a 3-way speaker using the mid-range speakers 730-2,730-3,740-1, and 740-2.

Figure 7E:
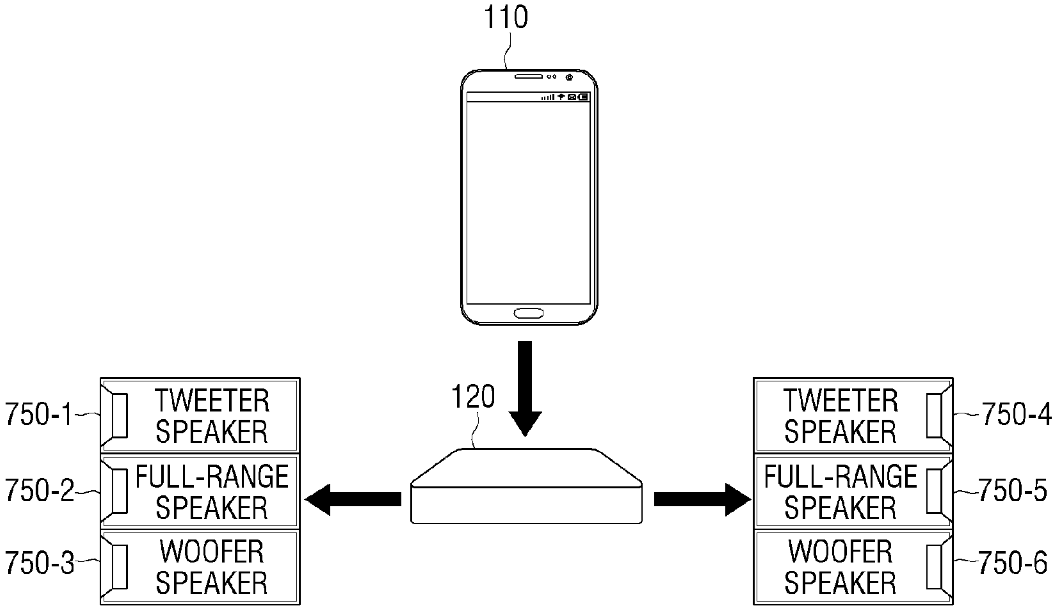
Figure 7F:
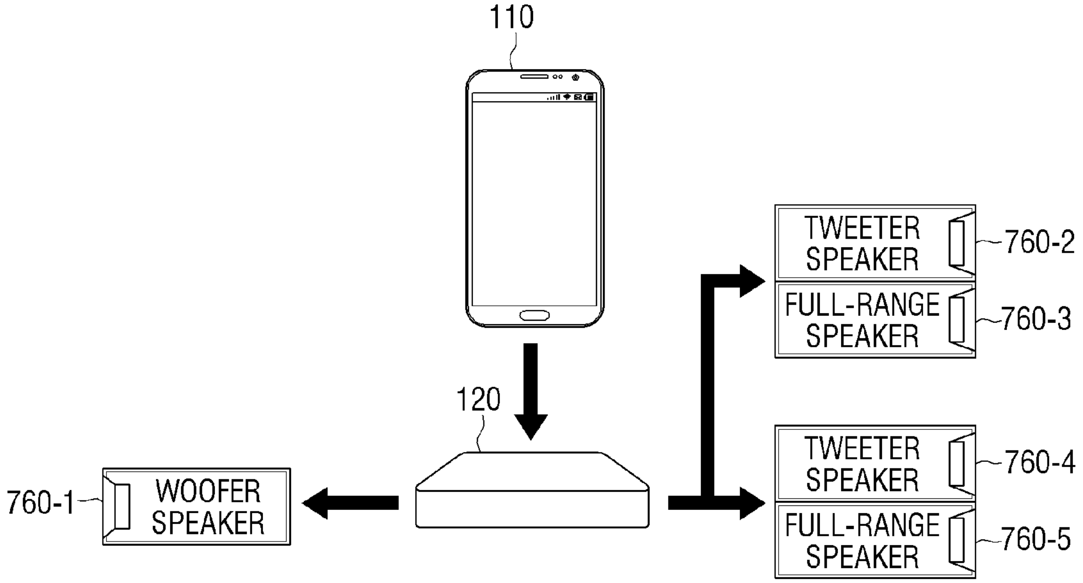

FIGS. 7E and 7F are diagrams for explanation of reconfiguring a plurality of one-way speakers as a multi-way and multi-channel speaker using a woofer speaker according to an exemplary embodiment.

A woofer speaker is a speaker for reproducing low-band audio. In particular, the full-range speaker or the mid-range speaker has a higher resonance point Fo of a speaker than the woofer speaker, and thus, there is a limit in reproducing deep base. Accordingly, in order to compensate base reproduction of the full-range speaker or the mid-range speaker, the woofer speaker may be introduced.

In particular, as illustrated in FIG. 7E, woofer speakers 750-3 and 750-6 may be connected to tweeter speakers 750-1 and 750-4 and full-range speakers 750-2 and 750-5, respectively to configure a 2-channel audio environment. That is, the first tweeter speaker 750-1, the first full-range speaker 750-2, and the first woofer speaker 750-3 may be sequentially connected to operate as a multi-way speaker for reproducing an audio signal of a left channel, and the second tweeter speaker 750-4, the second full-range speaker 750-5, and the second woofer speaker 750-6 may be sequentially connected to operate as a multi-way speaker for reproducing an audio signal of a right channel. Thus, the user may configure a 2-channel multi-way audio environment using the woofer speakers 750-3 and 750-6.

As illustrated in FIG. 7F, a woofer speaker 760-1 may operate as a separate one-way speaker, a first tweeter speaker 760-2 and a first full-range speaker 760-3 may be sequentially connected to operate as a multi-way speaker for reproducing an audio signal of a left channel, and a second tweeter speaker 760-4 and a second full-range speaker 760-5 may be sequentially connected to operate as a multi-way speaker for reproducing an audio signal of a right channel. Thus, the user may configure a 2.1-channel multi-way audio environment using the woofer speaker 760-1.

Comparing FIGS. 7E and 7F, a 2-channel audio environment or a 2.1-channel audio environment may be configured using two woofer speakers, two tweeter speakers, and two full-range speakers. Thus, a desired multi-way or multi-channel audio environment may be provided to the user by using a plurality of one-way speakers.

Figure 7G:
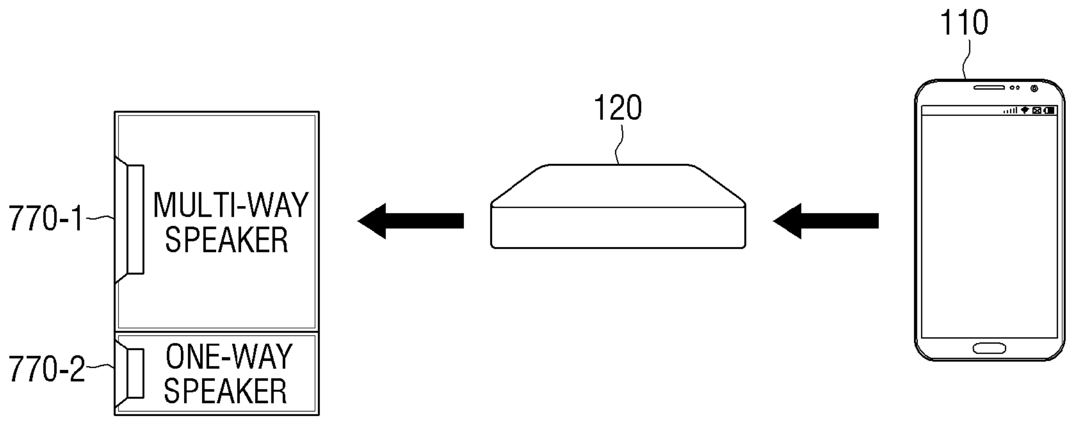

FIG. 7G is a diagram for explanation of reconfiguring another multi-way speaker using a multi-way speaker and a one-way speaker according to an exemplary embodiment. The multi-way speaker may be an integrated multi-way speaker formed by speakers of various reproduction bands. In detail, as illustrated in FIG. 7G, an integrated multi-way speaker 770-1 may be connected to other one-way speakers to operate another multi-way speaker 770-2.

According to the various exemplary embodiments described with reference to FIGS. 7A through 7G, the user may reconfigure a desired multi-way speaker by combining a plurality of one-way speakers and an integrated multi-way speaker using various methods.

According to an exemplary embodiment, the speaker apparatus 500 may include a speaker jacket installed in a plurality of speaker apparatuses in order to prevent diffraction and interference caused by coupling between speaker apparatuses.

Figure 8A:
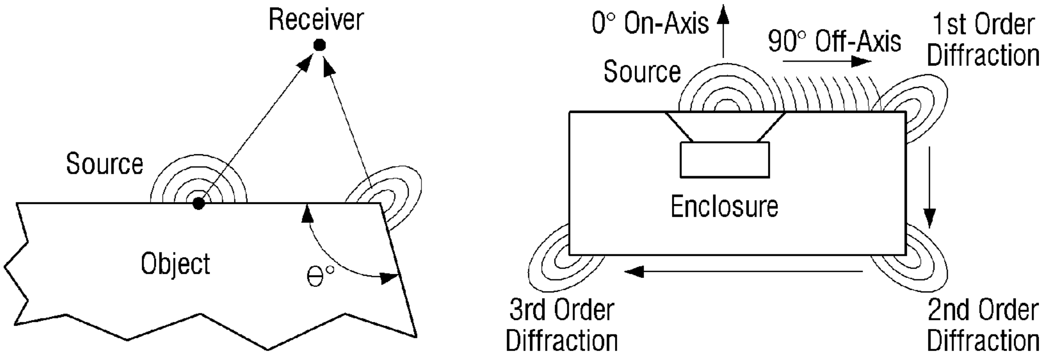
FIGS. 8A and 8B are diagrams for explanation of an effect of a speaker jacket according to an exemplary embodiment.

In detail, when the speaker apparatus 500 is shaped like an angulated solid figure, if a plurality of speaker apparatuses are connected, discontinuous portions causing diffraction and interference may be formed at coupling portions and edges of the connected speaker apparatuses. In detail, as illustrated in a right portion of FIG. 8B, diffraction may be caused in audio at angulated portions of the connected speaker apparatuses. Due to the diffraction, interference may occur between the diffracted audio signal and an output audio signal, as illustrated in FIG. 8A.

Figure 8B:
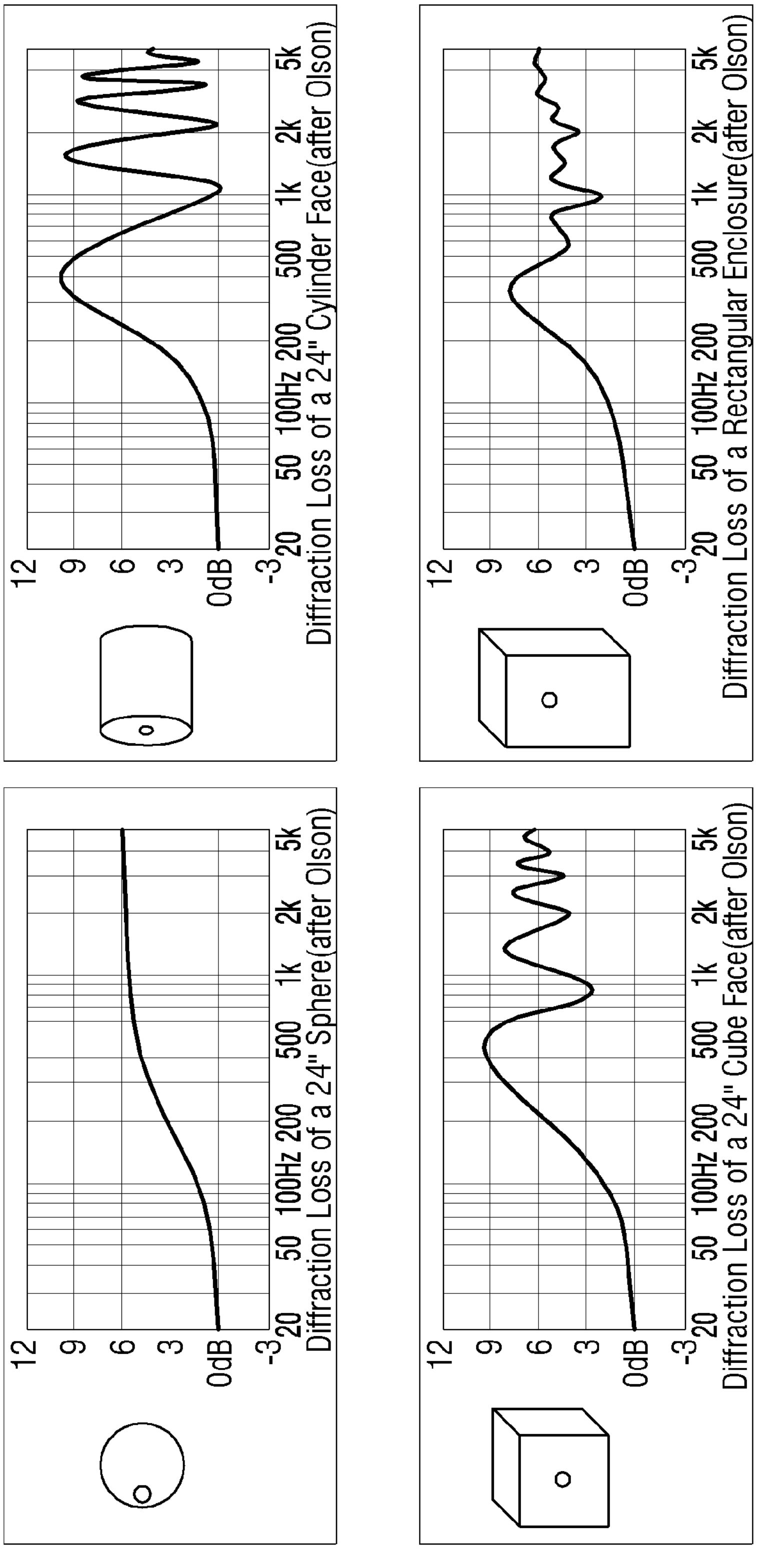

In order to overcome this problem, the speaker apparatus 500 may include speaker jackets for preventing diffraction and interference, covering outer surfaces of a plurality of speaker apparatuses. The speaker jacket may be shaped like a circle in order to minimize diffraction, as illustrated in FIG. 8B.

However, a correction filter for compensating the frequency characteristics of each speaker jacket may be previously designed so as to select various type speaker jackets according to user preference and may be stored in the speaker apparatus 500 in the form of library. The speaker apparatus 500 may recognize a shape of an installed speaker jacket via a detector (not shown), extract a correction filter corresponding to the speaker jacket recognized from the library, and correct an audio signal.

The speaker apparatus 500 may include an adjustable speaker stand according to a height of a user. The shapes/colors/materials of the speaker jacket and the speaker stand may be changed according to user preference also in the same multi-way combination.

Figure 9A:
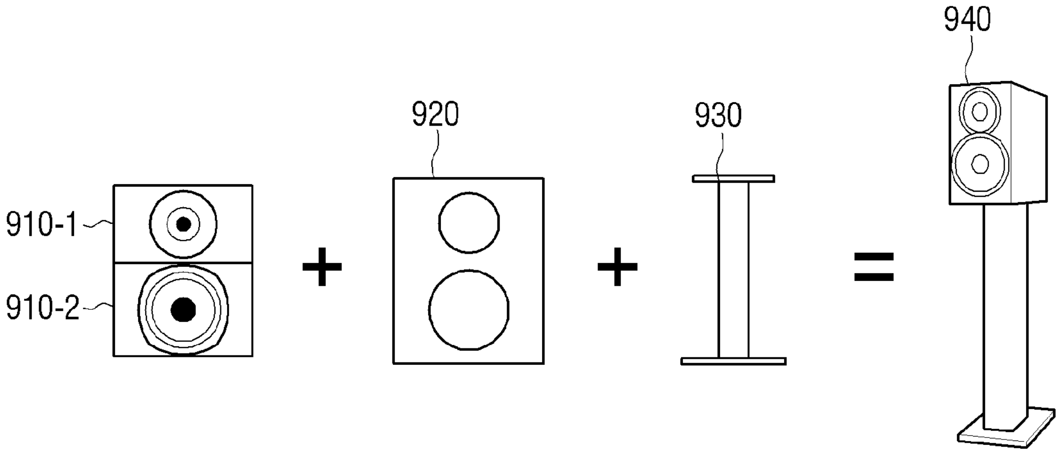
FIGS. 9A and 9B are diagrams for explanation of a speaker apparatus to which a speaker, a speaker jacket, and a speaker stand are coupled, according to an exemplary embodiment.

For example, as illustrated in FIG. 9A, a tall-boy type 2-way speaker apparatus 940 may be embodied using a tweeter speaker 910-1, a full-range speaker 910-2, a rectangular speaker jacket 920, and a speaker stand 930.

Figure 9B:
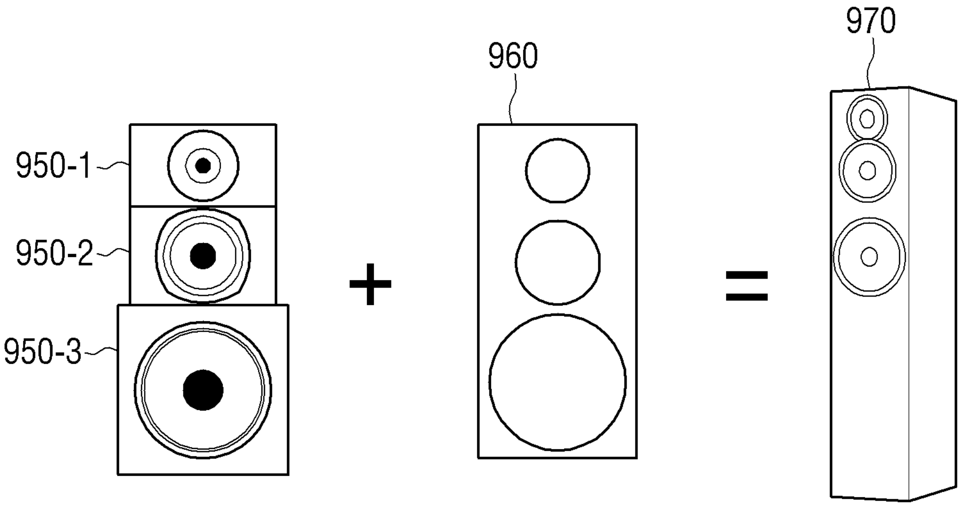

As another example, as illustrated in FIG. 9B, a 3-way speaker apparatus 970 may be embodied using a tweeter speaker 950-1, a full-range speaker 950-2, a woofer speaker 950-3, and a speaker jacket 960.

Hereinafter, a multi-way speaker and a multi-channel audio environment according to various exemplary embodiments will be described with reference to FIGS. 10A to 10E.

Figure 10A:
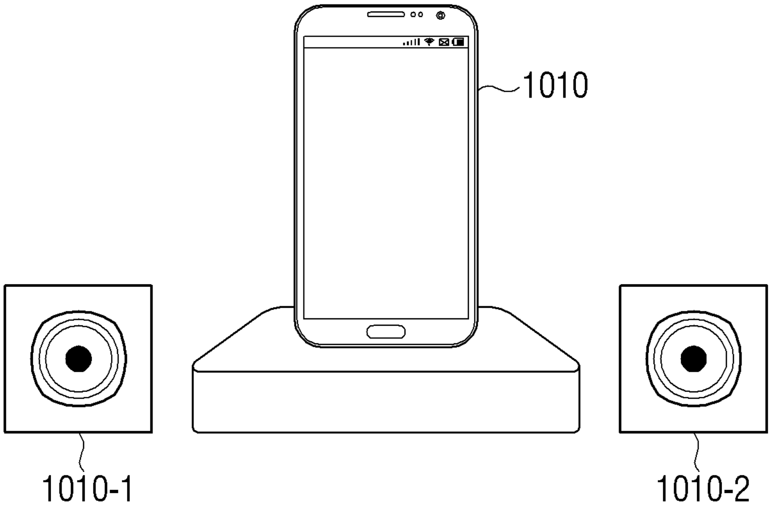
FIGS. 10A to 10E are diagrams for explanation of various multi-way and multi-channel configurations using a speaker apparatus according to an exemplary embodiment.

FIG. 10A is a diagram illustrating configuration of a 2-channel audio environment using a one-way speaker according to an exemplary embodiment. In detail, a left speaker 1010-1 and a right speaker 1010-2 may be embodied using two one-way speakers so as to reproduce an audio signal received from a smart phone 1010 in a 2-channel audio environment. In particular, according to the exemplary embodiment of FIG. 10A, a 2-channel audio environment may be embodied outdoors instead of in the home by using two one-way speakers 1010-1 and 1010-2 having excellent portability.

Figure 10B:
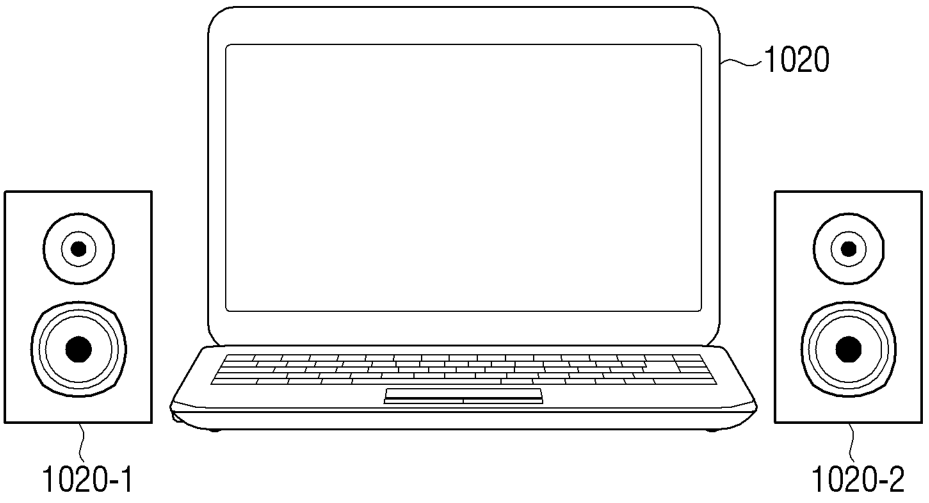

FIG. 10B is a diagram illustrating configuration of a 2-channel audio environment by combining 2-way speakers according to an exemplary embodiment. In detail, a 2-way left speaker 1020-1 may be embodied by connecting two one-way speakers and a 2-way right speaker 1020-2 may be embodied by connecting two speakers so as to reproduce an audio signal received from a notebook computer 1020 in a 2-channel audio environment configured by a 2-way speaker.

Figure 10C:
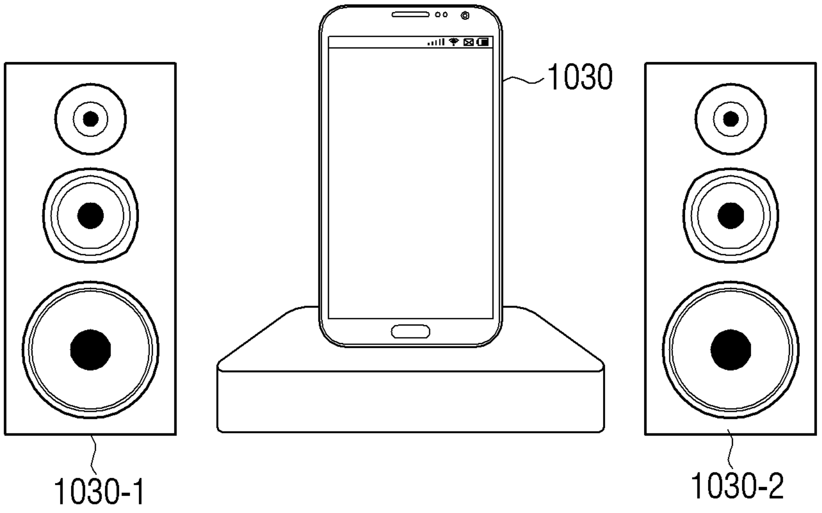

FIG. 10C is a diagram illustrating configuration of a 2-channel audio environment by combining one-way speakers according to an exemplary embodiment. In detail, a 3-way left speaker 1030-1 may be embodied by connecting three one-way speakers and a 3-way right speaker 1030-2 may be embodied by connecting three one-way speakers so as to reproduce an audio signal received from a smart phone 1030 in a 2-channel audio environment configured by a 3-way speaker.

Figure 10D:
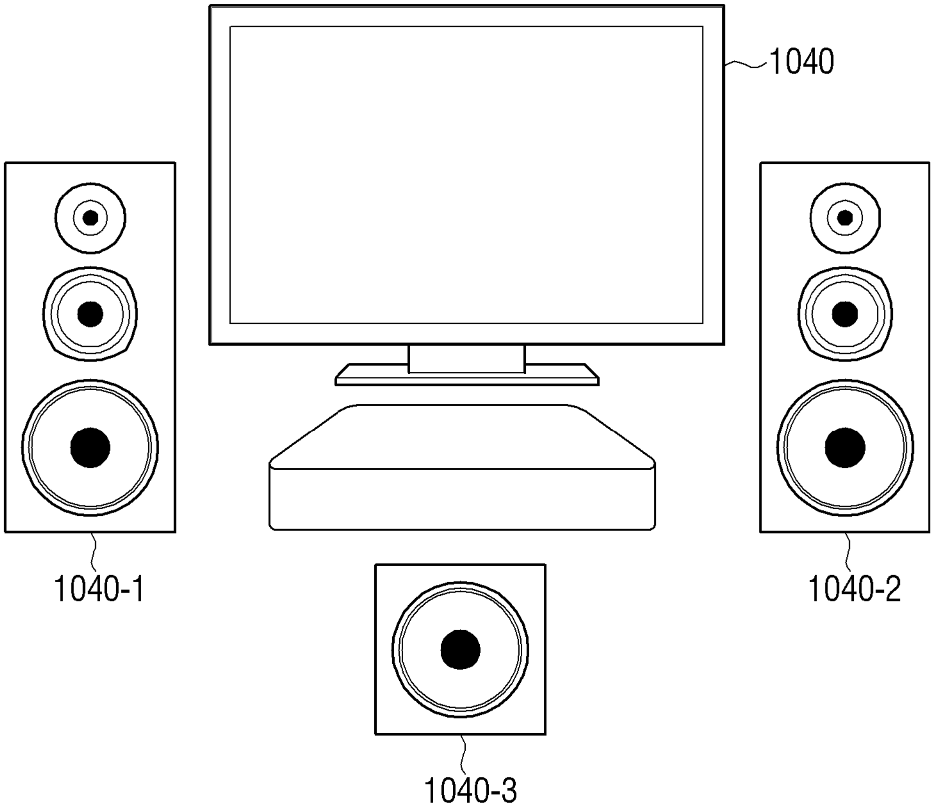

FIG. 10D is a diagram illustrating configuration of a 2.1-channel audio environment by combining one-way speakers according to an exemplary embodiment. In detail, a 3-way left speaker 1040-1 may be embodied by connecting three one-way speakers, a 3-way right speaker 1040-2 may be embodied by connecting three one-way speakers, and a sub-woofer speaker 1040-3 may be embodied via one woofer speaker so as to reproduce an audio signal received from a desk top PC 1040 in a 2.1-channel audio environment configured by a 3-way speaker.

Figure 10E:
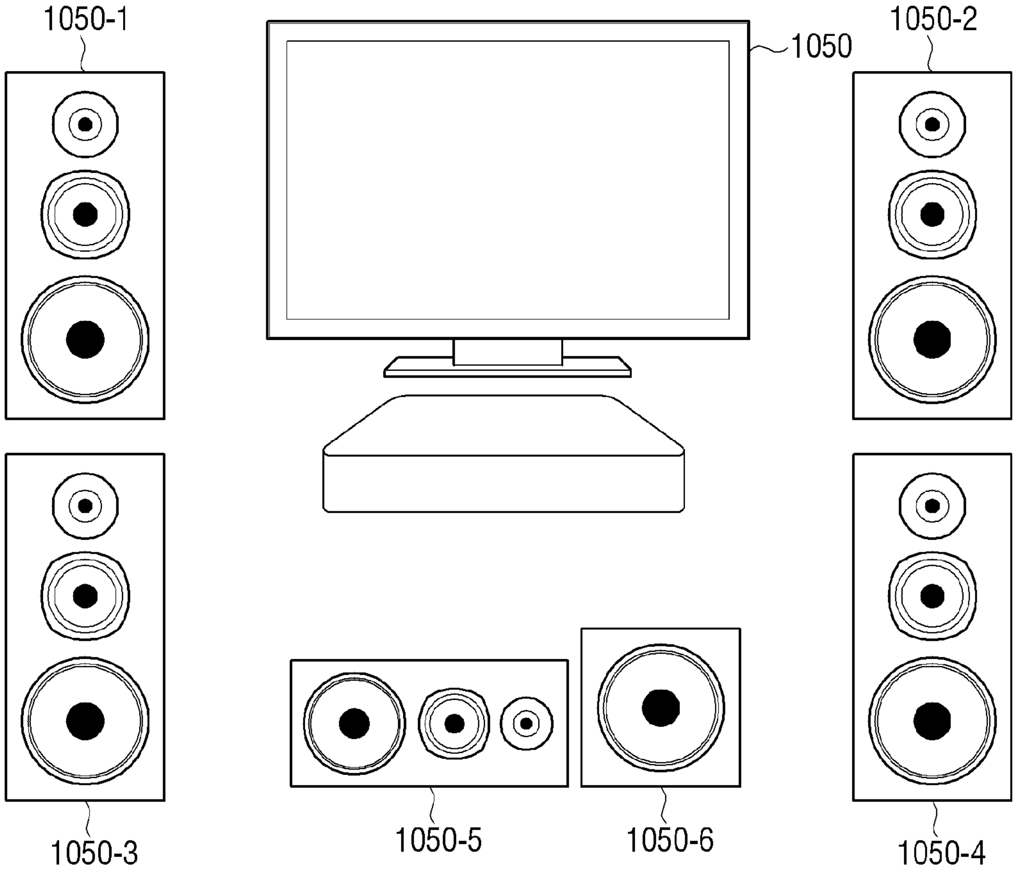

FIG. 10E is a diagram illustrating configuration of a 5.1-channel audio environment by combining one-way speakers according to an exemplary embodiment. In detail, a 3-way front left speaker 1050-1 may be embodied by connecting three one-way speakers, a 3-way front right speaker 1050-2 may be embodied by connecting three one-way speakers, a 3-way rear left speaker 1050-3 may be embodied by connecting three one-way speakers, a 3-way rear right speaker 1050-4 may be embodied by connecting three one-way speakers, a 3-way center speaker 1050-5 may be embodied by connecting three one-way speakers, and a sub-woofer speaker 1050-6 may be embodied via one woofer speaker so as to reproduce an audio signal received from a home theater system in a 5.1-channel audio environment configured by a 3-way speaker.

As described with reference to FIGS. 10A to 10E, various multi-way speakers and multi-channel audio environments may be embodied by combining one-way speakers such that a user may embody various audio environments by combining and changing one-way speakers without buying a separate audio system. In addition, the user may extend the multi-channel audio environment described with reference to FIGS. 10A to 10E to a multi-channel audio environment such as a 7.1 channel and so on.

Figure 11A:
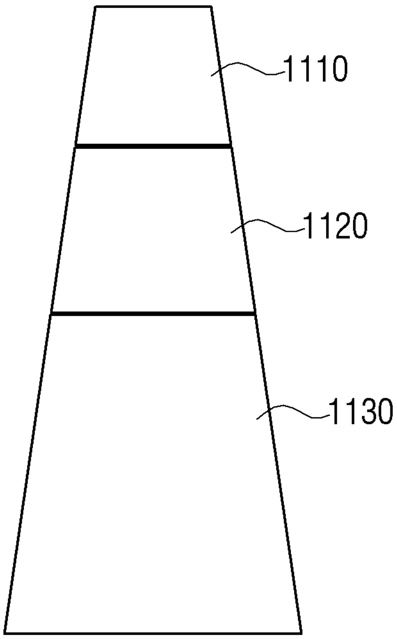
FIGS. 11A to 11D illustrate an outer appearance of a speaker apparatus according to another exemplary embodiment.
Figure 11B:
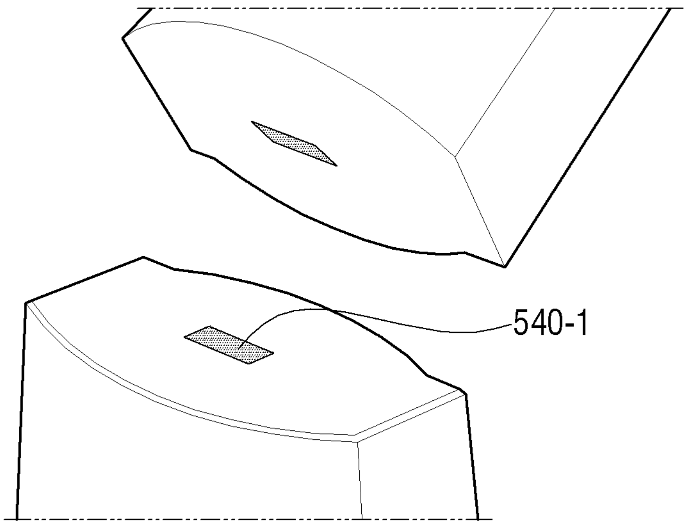
Figure 11C:
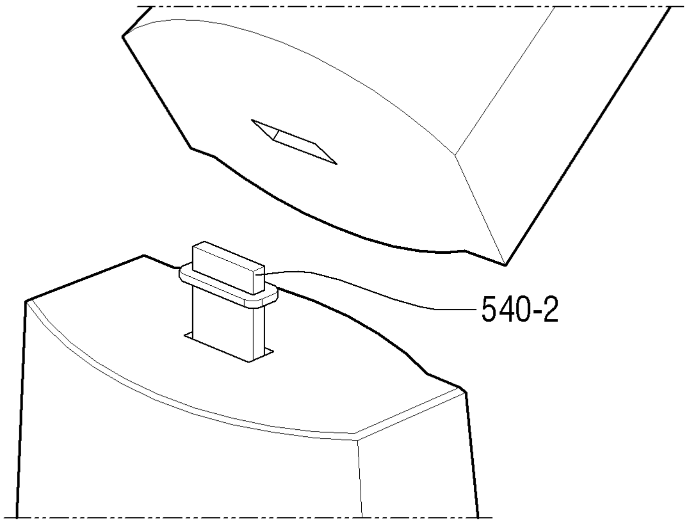
Figure 11D:
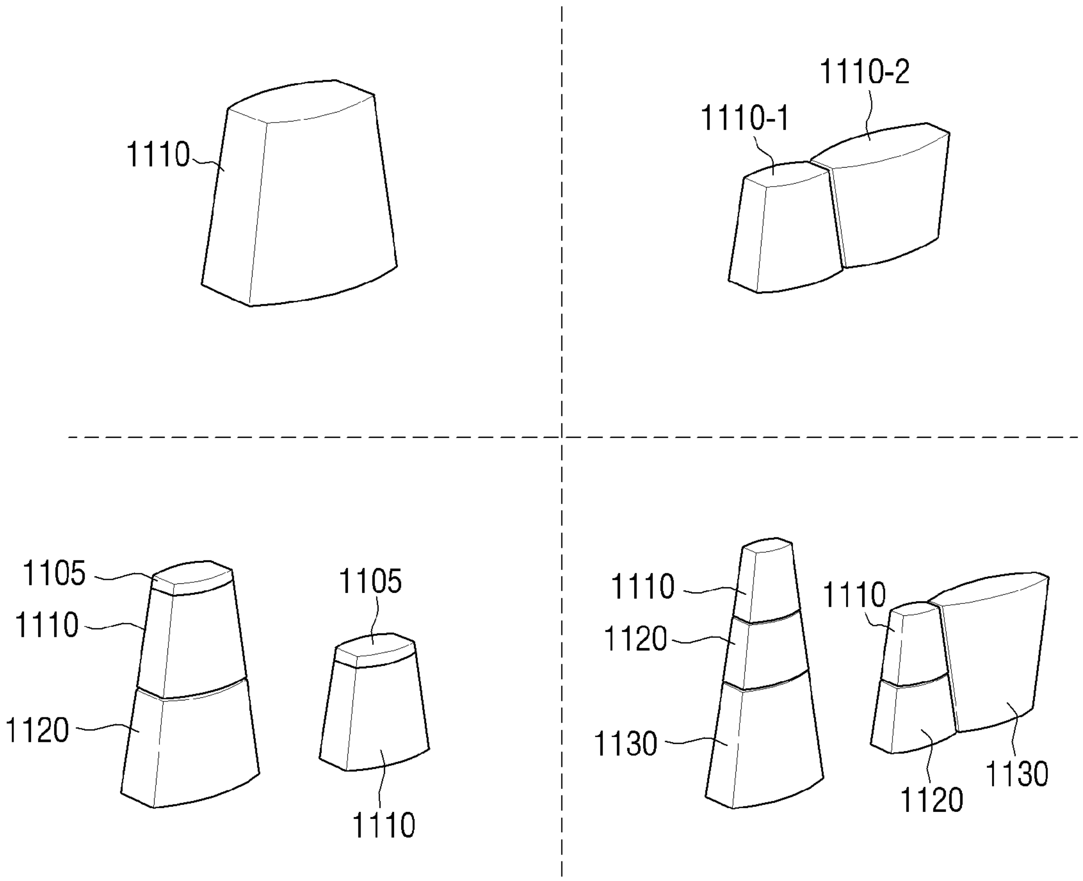

According to the aforementioned exemplary embodiments, the speaker apparatus 500 has a rectangular parallelepiped shape, which is purely exemplary. That is, the speaker apparatus 500 may have various shapes. For example, as illustrated in FIG. 11A, the speaker apparatus 500 may have a trapezoidal shape. The size of the speaker apparatus 500 may be changed according to a type of a speaker apparatus. For example, the sizes of a tweeter speaker 1110, a mid-range speaker 1120, and a woofer speaker 1130 may be increased in this order. In addition, when the speaker apparatus 500 is trapezoidal shaped, speaker apparatuses may be connected by a magnet connector 540-1, as illustrated in FIG. 11B. Alternatively, as illustrated in FIG. 11C, speaker apparatuses may be connected by a protruding connector 540-2. In addition, when the speaker apparatus 500 is shaped like a trapezoidal shape, the speaker apparatus 500 may operate as one speaker apparatus 1110, as illustrated in a left upper portion of FIG. 11D. In this case, when the speaker apparatus 500 operates as one speaker apparatus 1110, the user may conveniently use the speaker apparatus 1110 as a portable apparatus. In addition, as illustrated in a right upper portion of FIG. 11D, two speakers 1110-1 and 1110-2 may be connected in a horizontal direction. In this case, when the two speakers 1110-1 and 1110-2 are connected in a horizontal direction, the two speakers 1110-1 and 1110-2 may operate as a center speaker. In addition, as illustrated in a left lower portion of FIG. 11D, three speakers 1105, 1110, and 1120 may be connected in a vertical direction or two speakers 1105 and 1110 may be connected in a vertical direction. In this case, when at least two speakers are connected in a vertical direction, at least two speakers may operate as a mini station or a satellite speaker. In addition, as illustrated in a right lower portion of FIG. 11D, two speakers 1110 and 1120 and a long woofer speaker 1130 are connected in a horizontal direction or a vertical direction. In this case, when the two speakers 1110 and 1120 and the long woofer speaker 1130 are connected, the connected speakers may operate a tall boy type speaker.

As described above, the speaker apparatus 500 may have a trapezoidal shape so as to connect speaker apparatuses as well as to improve aesthetic appreciation.

According to the aforementioned exemplary embodiments, the plurality of speaker modules 140-1 to **140-*n* operate by the home control module 120, which is purely exemplary. That is, when the home control module 120 is not present, the technical feature of exemplary embodiments may also be applied. In particular, when a user listens to audio outdoor instead of in the home, the home control module 120** may not be present.

Figure 12:
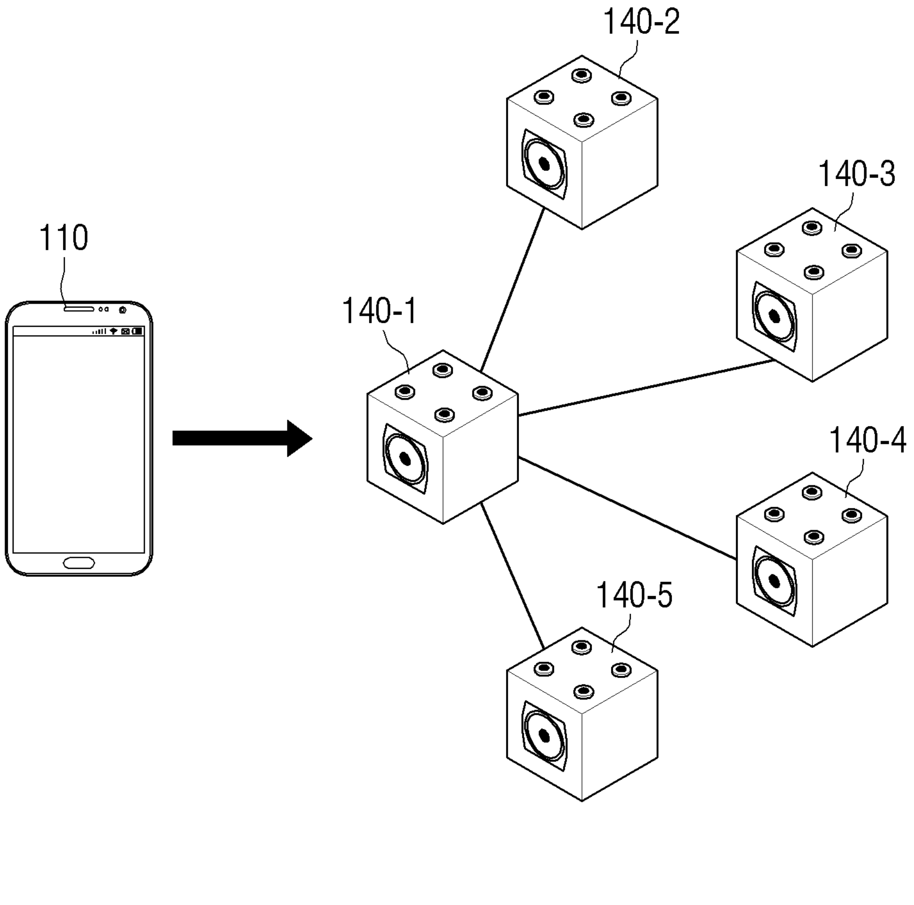
FIG. 12 is a diagram for explanation of a case in which a plurality of speakers operates outdoor according to another exemplary embodiment.

In this case, as illustrated in FIG. 12, the first speaker module 140-1 of a plurality of speaker modules 140-1 to 140-5 may perform a function of the home control module 120. In detail, the first speaker module 140-1 may receive an audio signal from the source 110, process the received audio signal to generate a multi-channel audio signal, output an audio signal of some channels of the multi-channel audio signal via the first speaker module 140-1 itself, and transmit an audio signal of the remaining channels of the multi-channel audio signal to second to fifth speaker modules 140-2 to 140-5. The speaker module 140-1 that performs a function of the home control module 120 may be selected by the user via a UI of the source 110.

As described above, when the home control module 120 is not present, one of a plurality of speaker modules may also perform a function of the home control module 120 so as to embody various audio environments.

The audio outputting method according to the various aforementioned exemplary embodiments may be executed as a program and provided to a display apparatus. In particular, a program including the audio outputting method may be stored and provided in a non-transitory computer readable medium.

The non-transitory computer readable medium is a medium that semi-permanently stores data and from which data is readable by a device. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the inventive concept, as defined by the appended claims, and many alternatives, modifications, and variations will be apparent to those skilled in the art.

What is claimed is:

1. A first speaker apparatus comprising:
- a communicator configured to receive an audio signal from an audio source;
- a first speaker configured to output audio;
- a connector configured to physically connect the first speaker apparatus with a connector of a second speaker apparatus;
- a signal processor configured to process the received audio signal; and
- a controller configured to:
  - in response to the first speaker apparatus being physically connected to the connector of the second speaker apparatus, control the signal processor to generate a first audio signal for the first speaker and a second audio signal for a second speaker of the second speaker apparatus based on information of the first speaker apparatus and information the second speaker apparatus, and generate a third audio signal based on user information and information of an external speaker apparatus,
  - control the communicator to transmit the third audio signal to the external speaker apparatus, and
  - control the first speaker and the second speaker to output audio of the first audio signal and audio of the second audio signal.

2. The first speaker apparatus as claimed in claim 1, wherein each of the first speaker and the second speaker comprises one of a full-range speaker, a tweeter speaker, a mid-range speaker, a woofer speaker, and a multi-way speaker.

3. The first speaker apparatus as claimed in claim 1, wherein the information of the external speaker apparatus comprises at least one of a connection correlation, locations, and radiation directions of a plurality of speaker apparatus including the external speaker apparatus, the first speaker apparatus, and the second speaker apparatus, and
- wherein the user information comprises at least one of a current location, a moving direction, and preferred sound source information of a user.

4. The first speaker apparatus as claimed in claim 3, wherein the controller is further configured to, in response to determining that the current location of the user is within a first area including the first speaker apparatus and the second speaker apparatus, control the first speaker and the second speaker to output the audio of the first audio signal and the audio of the second audio signal and control the communicator to stop transmitting the third audio signal to the external speaker apparatus, and wherein the controller is further configured to, in response to determining that the user has moved from the first area to a second area including the external speaker apparatus, control the first speaker and the second speaker to stop outputting the audio of the first audio signal and the audio of the second audio signal and control the communicator to transmit the third audio signal to the external speaker apparatus.

5. The first speaker apparatus as claimed in claim 3, further comprising a speaker jacket configured to prevent diffraction and interference generated due to coupling between the first speaker apparatus and the second speaker apparatus.

6. The first speaker apparatus as claimed in claim 1, wherein the controller is further configured to determine a type of the second speaker and filter the received audio signal according to the determined type.

* * * * *